United States Patent

[11] 3,597,019

| [72] | Inventors | Otto Körner;<br>Fritz Benninghoff, both of Remscheid, Germany |
|---|---|---|
| [21] | Appl. No. | 794,503 |
| [22] | Filed | Jan. 28, 1969 |
| [45] | Patented | Aug. 3, 1971 |
| [73] | Assignee | Diehl K. G.<br>Remscheid, Germany |
| [32] | Priority | Jan. 30, 1968 |
| [33] | | Germany |
| [31] | | P 16 80 835.8 |

[54] TRACK LINK FOR AMPHIBIOUS AND CROSS-COUNTRY TRACK-LAYING VEHICLES
1 Claim, 3 Drawing Figs.

[52] U.S. Cl. ........................................... 305/54, 305/58
[51] Int. Cl. ........................................... B62d 55/26

[50] Field of Search ........................................... 305/36, 58, 59, 54, 55

[56] References Cited
UNITED STATES PATENTS

| 2,186,979 | 1/1940 | Knox | 305/36 |
| 2,409,207 | 10/1946 | Hollenkamp | 305/54 |
| 2,645,532 | 7/1953 | Hollenkamp | 305/54 |

*Primary Examiner*—Richard J. Johnson
*Attorney*—Walter Becker

ABSTRACT: A connector having chain-bolt-receiving eyes for interconnecting successive chain links of the track chain of amphibious and cross-country track-laying vehicles, which includes ladle-shaped plate means for bottom surfaces provided with rib means and having lateral walls extending upwardly to approximately the level of said bolt-receiving eyes.

PATENTED AUG 3 1971  3,597,019

INVENTORS
Otto KÖRNER
Fritz BENNINGHOFF

By Walter Becker

TRACK LINK FOR AMPHIBIOUS AND CROSS-COUNTRY TRACK-LAYING VEHICLES

The present invention relates to a track chain for amphibious and cross-country track-laying vehicles in which the links interconnecting the individual succeeding chain links are laterally placed upon the joint bolts of the chain links and are clamped thereto by means of a clamping screw.

A track chain connecting link has become known which is provided with a device for tightening the joint bolt of track chain links by means of a clamping screw arranged between the two bearing eyes. Such track chain connecting link has for instance an axial width of 40 millimeters while the chain link itself has an axial width of approximately 175 millimeters. When driving on a street, the total vehicle load is absorbed by running cushions mounted on the chain link. During cross-country drive during which the cushions may be replaced by traction shoes, not only the entire track chain link but also the connector engages the ground and is pressed thereinto.

It is an object of the present invention on one hand to reduce the specific engaging pressure, i.e. to increase the total engaging surface of the chain, and on the other hand with an amphibious track-laying vehicle to increase the forward drive of the track or chain.

These objects and other objects and advantages of the invention will appear more clearly from the following specification, in connection with the accompanying drawing, in which.

The track chain according to the present invention for amphibious and cross-country track-laying vehicles in which the connecting links which connect the individual succeeding chain links are laterally placed upon the joint bolts of the chain links and are clamped thereonto by means of a clamping screw is characterized primarily in that the connector is provided with a spoon-shaped plate which for purposes of increasing the water resistance is at its central portion provided with a downwardly extending rib and has at its sides marginal portions which extend upwardly to approximately a plane passing through the center of the bearing eyes of the connector.

The spoon-shaped plate may be provided with vertical passages. The plate which protrudes laterally far beyond the connecting link or connector brings about a considerable increase in the total engaging surface of the track chain with the soft ground during a cross-country drive and thus brings about a reduced specific ground pressure.

The laterally upwardly extending marginal portions, the rib and the said passages, which latter contribute to a reduction in the weight, serve for forward driving the chain during its amphibious operation.

Figure 1:
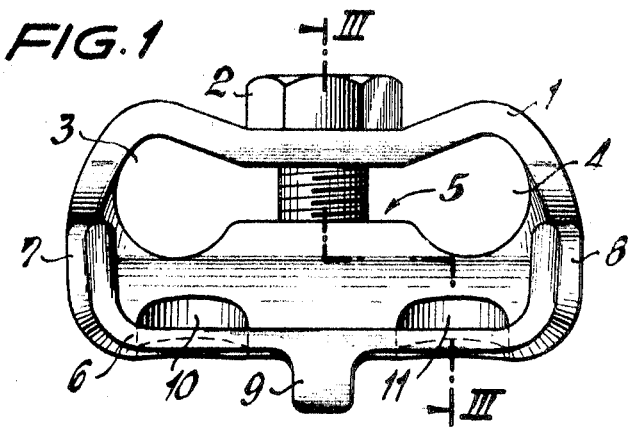
FIG. 1 illustrates a side view of a track chain connector with a device according to the invention.

Referring now to the drawing in detail, FIG. 1 shows a connector or connecting link 1 with a horizontal slot 5, said slot interconnecting bearing eyes 3, 4 for the chain bolts. By means of a clamping screw 2 which is arranged between the two bearing eyes 3, 4 it is possible to reduce the width of the slot 5 in which instance the bearing eyes 3, 4 will firmly embrace and clamp the nonillustrated joint bolts of the chain links, which bolts are shaped in conformity with the eye profile.

Figure 2:
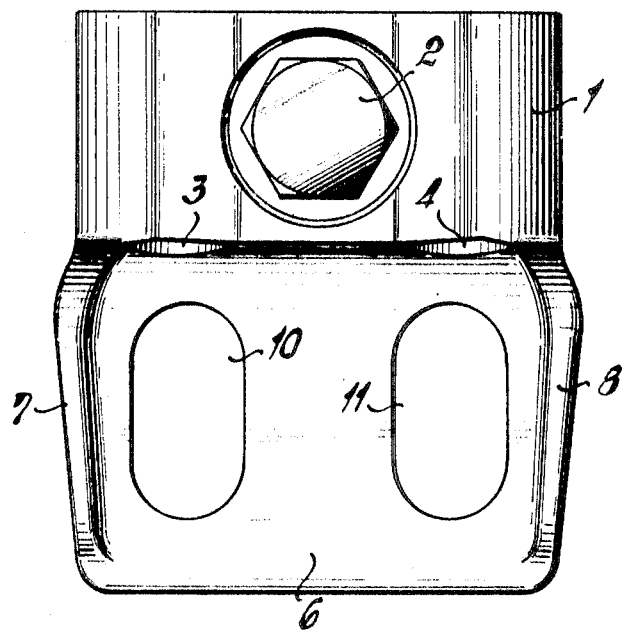
FIG. 2 is a top view of the connector of FIG. 1.
Figure 3:
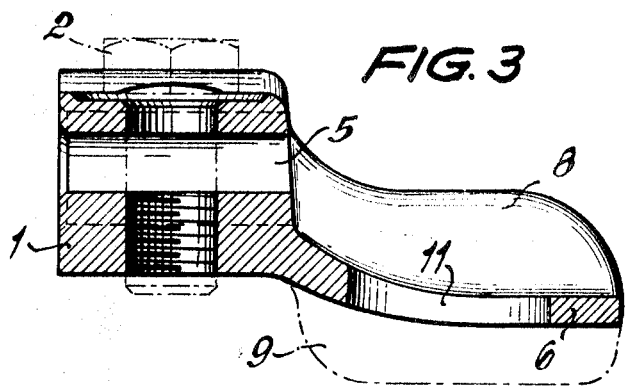
FIG. 3 represents a section through the connector, said section being taken along the line III–III of FIG. 1.

As will be evident from FIGS. 2 and 3, the connector 1 has forged thereto a spoon-shaped plate 6 which axially extends far beyond the connector 1. Marginal areas 7, 8 of plate 6 extend laterally approximately up to the level of the slot 5. Furthermore, the plate 6 is at its central portion provided with a downwardly extending rib 9. The plate 6 furthermore has two longitudinal vertical passages 10, 11.

As will be seen from FIG. 2, the plate 6 increases the bottom engaging surface by about twice the engaging surface of the connector 1. Finally, it will be seen from FIG. 3 that the plate 6, whose marginal areas 7, 8 and rib 9 form the forward driving effective surfaces during amphibious operation will act as blade while the passages 10, 11 in view of the created turbulence of the water will even increase the effective driving surfaces and thereby the drive.

For the sake of completeness and a showing how the connector according to the invention may be used for interconnecting two succeeding chain links, reference may be had to FIG. 8 of U.S. Pat. No. 2,957,731. However, it should be noted that this reference is merely by way of example and that the connector according to the present invention may also be used for interconnecting other types of chain links.

It is, of course, to be understood that the present invention is, by no means, limited to the particular showing in the drawing, but also comprises any modifications within the scope of the appended claims.

What we claim is:

1. In a connector having chain-bolt receiving eyes and a slot communicating with and connecting said eyes, the lower portion of said connector forming the lower sides of said eyes and slot being a substantially rigid block and the upper portion forming the upper sides of said eyes and slot being a slightly resilient web, said connector having a screw extending through said upper portion and said slot between said eyes and threaded into said lower portion, a ladle-shaped plate integral with said connector extending laterally and curving downwardly from said rigid lower portion to a substantially horizontal web portion, a centrally located, downwardly projecting rib on the lower side of said plate extending to its outer extremity from its junction with said rigid portion, upwardly projecting flanges on the opposite edges of said plate integral with said rigid portion and said plate with each of their upper edges curving downwardly from said rigid portion to a horizontal edge which is at least as high as the lower side of said slot, and passages through said plate on opposite sides of said rib and between said rib and said flanges, each passage being of a width equal to at least one-half the distance between said rib and the adjacent flange and of a lateral extent at least one-half that of the flange, so that said passages provide substantial areas for passage of water in amphibious operation and increase the effectiveness of the driving surfaces of said rib and flanges.